United States Patent [19]

Schaefer et al.

[11] 4,295,908

[45] Oct. 20, 1981

[54] METHOD AND APPARATUS FOR HEAT SEALING A PLURALITY OF SETS OF CONTINUOUS PLASTIC STRIPS TOGETHER BY RADIO FREQUENCY ENERGY

[75] Inventors: Hans G. Schaefer, Lakewood; Alfred Langer, Westminster, both of Calif.

[73] Assignee: Manhattan R. F. Die Company, South Gate, Calif.

[21] Appl. No.: 102,130

[22] Filed: Dec. 10, 1979

[51] Int. Cl.³ .................. B29C 27/04; B32B 31/18; B32B 31/20
[52] U.S. Cl. .................. 156/251; 100/93 P; 100/196; 156/253; 156/273; 156/288; 219/10.53; 219/10.81; 156/290; 156/553; 156/554; 156/380.5; 156/510; 156/515; 156/518
[58] Field of Search ............... 156/251, 273, 274, 498, 156/515, 380, 253, 288, 290, 518, 553, 554; 100/208, 194, 93 P, 196; 219/10.53, 10.81

[56] References Cited

U.S. PATENT DOCUMENTS

| | | | |
|---|---|---|---|
| 1,113,297 | 10/1914 | Bernauer | 100/194 |
| 2,307,344 | 1/1943 | Zottu | 156/273 |
| 2,587,034 | 2/1952 | Dobbs et al. | 156/380 |
| 2,758,631 | 8/1956 | Peterson et al. | 156/380 |
| 3,045,376 | 7/1962 | Levinsohn | 156/380 |
| 3,088,860 | 5/1963 | Scholl | 156/273 |
| 3,236,176 | 2/1966 | Fischer | 100/195 |
| 3,860,381 | 1/1975 | Pesch | 100/194 |
| 4,043,858 | 8/1977 | Dantowitz | 156/273 |
| 4,101,363 | 7/1978 | Lotto | 156/498 |

*Primary Examiner*—Michael G. Wityshyn
*Attorney, Agent, or Firm*—Sellers and Brace

[57] ABSTRACT

Radio frequency heat sealing method and apparatus for simultaneously fabricating a plurality of separate items from separate sets of continuous plastic strips or sheets as these sets are indexed in unison past a heat sealing station. The technique utilizes a platen equipped with heat fusing and tear sealing dies on its opposite faces and which platen is located between separate sets of plastic strips and a pair of cooperating platens. The die equipped intermediate platen is preferably cooled to permit rapid cycling and indexing of the sets of stripping therepast.

27 Claims, 6 Drawing Figures

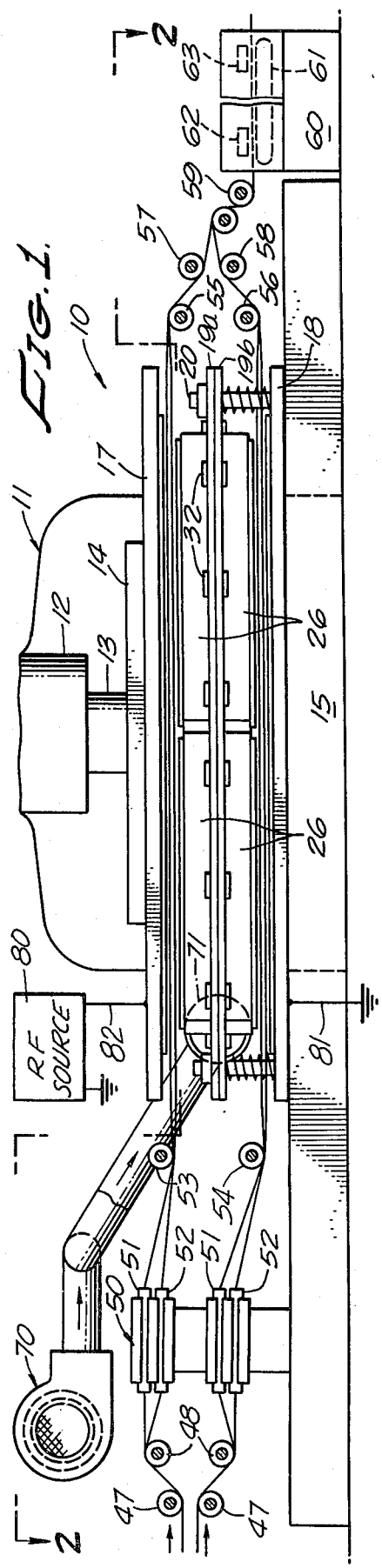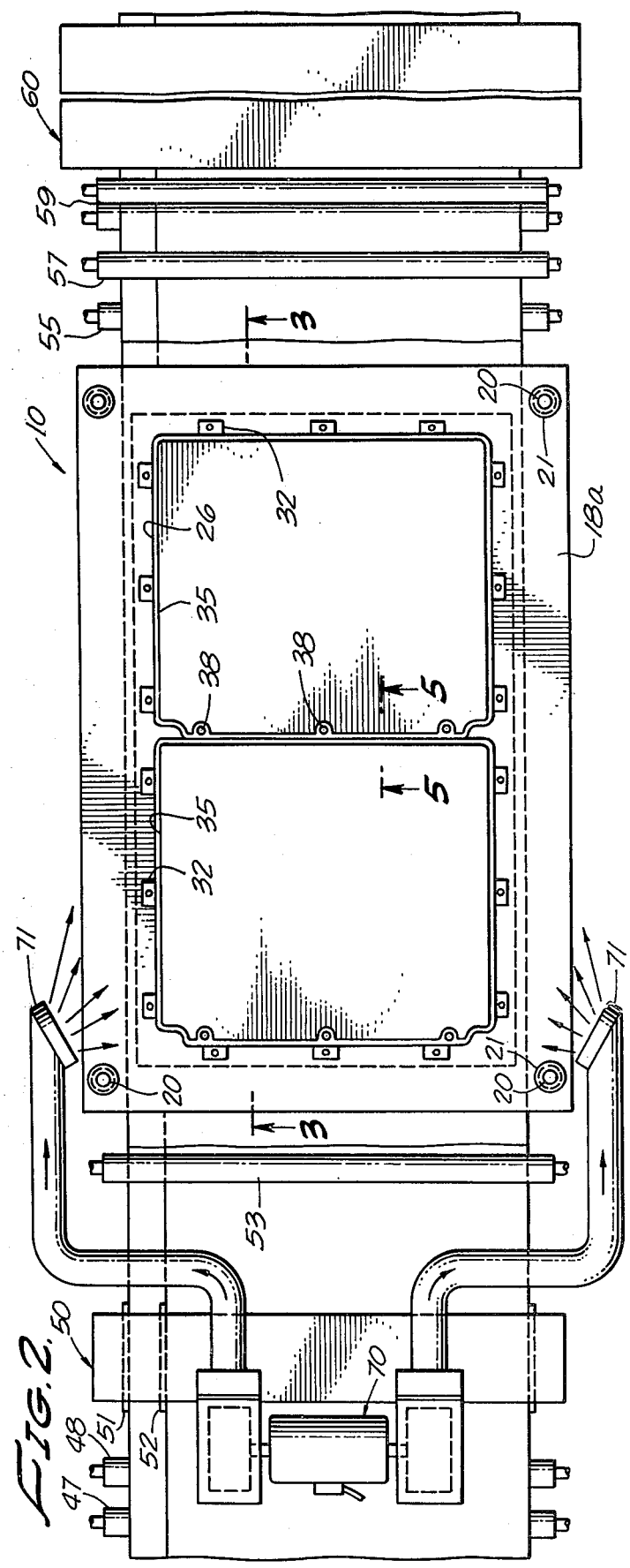

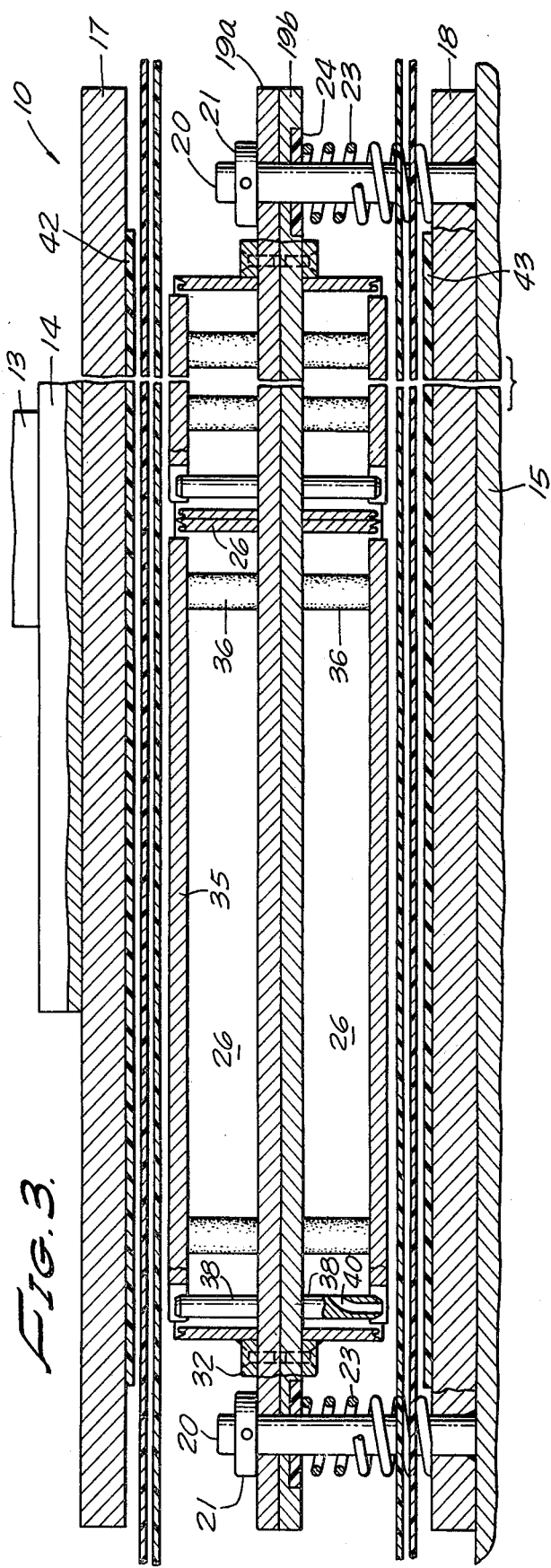

METHOD AND APPARATUS FOR HEAT SEALING A PLURALITY OF SETS OF CONTINUOUS PLASTIC STRIPS TOGETHER BY RADIO FREQUENCY ENERGY

This invention relates to the plastic fabricating art, and more particularly to a unique radio frequency powered press and method for simultaneously processing a plurality of sets of continuous plastic strips to seal the strips of each set together and for forming a tear seal before indexing the sets forwardly and repeating these operations.

BACKGROUND OF THE INVENTION

Radio frequency powered sealing apparatus has been proposed heretofore for heat sealing a single set of superimposed strips of plastic sheeting together including means for forming a tear seal contiguous to the heat seal to facilitate separation of a finished item from stock material. A great variety of finished articles of manufacture have been sealed together utilising this heat sealing technique but the equipment and methods employed heretofore have been restricted in various respects. For example, only a single item is commonly processsed by prior equipment including means for indexing strip material past a heat sealing station. The U.S. Pat. No. 2,758,631 granted to Peterson et al on Apr. 14, 1956 discloses apparatus having these features. Techniques have also been proposed for forming plastic cushion covers using heat sealing equipment in which the bottom and top plastic covers are heat sealed to the lateral edges of a gusset strip. The gusset strip is formed into a ring of appropriate size and this is assembled along the interior of a sealing die ring, the edges of the gusset being overturned and suitably anchored in place along the exterior of this die. This complex and cumbersome assembly is then placed between the press platens and energized with radio frequency energy to seal the components together. Thereafter the entire assembly is removed and the plastic product is detached following which other plastic components are assembled to the fully detached die and inserted in the press for the next sealing operation.

Attempts have been made to increase the size of the platens to permit multiple items to be sealed simultaneously in side-by-side relation as disclosed for example, in the U.S. Pat. No. 4,043,858 to Dantowitz. However, problems are encountered unless the individual items are relatively small. This is because of difficulties encountered in obtaining uniform distribution of electrical energy and sealing effectiveness in larger sized platens. In consequence, a satisfactory seal may be obtained in one area but an unsatisfactory seal in another area which of course results in a commercially unacceptable product. The uneven heating can also cause malfunctioning of the equipment and sticking of the plastic to the die components which results in costly loss of production time and may require removal of the dies for servicing and refinishing. In larger die assemblies it is also much more difficult and costly to achieve and maintain critically essential precise parallelism between the die and the cooperating platen.

SUMMARY OF THE INVENTION

The foregoing and numerous other shortcomings, limitations and disadvantages of prior heat sealing methods and equipment are avoided by the present invention by means of which production output has been nearly doubled using smaller equipment and substantially less power. These results are achieved with a unique unitary die assembly having a double faced floating die mounted between and normally out of contact with an upper and a lower platen. This assembly is mounted on the bed of a typical C-frame press with the upper and lower platens connected to the terminals of a suitable radio frequency generator. A plurality of sets of superimposed continuous strips of plastic are suitably aligned and advanced crosswise of the upper and lower faces of the center die by suitable indexing equipment. Closure and energization of the die assembly provides a plurality of items of manufacture during each operating cycle of a few seconds duration. Blowers serve to direct a cooling medium over the die at a rate to maintain the die components below the melting temperature of the plastic to provide highly effective and satisfactory heat sealing without risk of the dies adhering to the plastic material. The dies on each face of the center platen may be designed to produce either single or multiple items and each preferably includes means for automatically ejecting the finished product from the die lightly attached to the strip stock by a weak tear seal.

Accordingly, it is a primary object of this invention to provide a unique radio frequency powered apparatus and a unique method for simultaneously heat sealing a plurality of sets of plastic strips together;

Another object of this invention is the provision of apparatus for automatically indexing a plurality of sets of continuous plastic strips attached to the opposite faces of a double faced die energized by radio frequency energy to seal the strips of each set together in unison along a pre-selected area of each set of strips;

Another object of the invention is the provision of a radio frequency powered heat sealing die assembly featuring a floating double faced intermediate platen located between a pair of platens for use in simultaneously sealing separate sets of plastic sheets together;

Another object of the invention is the provision of a unique heat sealing die assembly insertable as a unit in a power press designed to process separate sets of plastic sheets and including means for circulating a cooling medium in contact with the sealing die;

Another object of the invention is the provision of radio frequency powered heat sealing apparatus utilizing a double faced sealing die floatingly supported between upper and lower platens electrically isolated therefrom with each face of the sealing die equipped with sealing dies in side-by-side relation and cooperating to heat seal a plurality of components opposite each face of the die during each operating cycle.

These and other more specific objects will appear upon reading the following specification and claims and upon considering in connection therewith the attached drawing to which they relate.

Referring now to the drawing in which a preferred embodiment of the invention is illustrated:

FIG. 1 is an elevational diagrammatic view showing an illustrative embodiment of our improved heat sealing die in open position with two sets of continuous plastic strips threaded therepast between supply equipment and take up indexing equipment;

FIG. 2 is a horizontal cross sectional view taken along the broken line 2—2 on FIG. 1;

FIG. 3 is an elevational view on an enlarged scale of the die assembly per se with portions broken away and in cross section to show structural details;

FIG. 4 is a fragmentary cross sectional view showing details of the sealing die, the hole blanking dies and the resilient ejector plate;

FIG. 5 is a fragmentary cross sectional view on a substantially enlarged scale taken along line 5—5 on FIG. 2 showing details of the combined sealing and tear seal die; and FIG. 6 is a perspective view of a typical plastic envelope formed by the illustrated sealing die and designed for mounting in a ring binder.

Referring more particularly to FIGS. 1 and 2, there is shown an illustrative embodiment of the invention sealing die assembly, designated generally 10, mounted in a conventional C-frame pneumatic press 11. This press is provided with a pneumatic cylinder 12 having a piston 13 provided with a header plate 14 suitably secured to the upper platen 17 of the die assembly as will be described more fully presently. The sealing die assembly 10 rests on the base or bed 15 of the press 11.

Die assembly 10 is shown on an enlarged scale in FIG. 3 and includes an upper platen 17, a lower platen 18, and an intermediate platen formed in two halves 19a and 19b suitably rigidly and detachably secured together by means not shown. The intermediate platen is floatingly supported on a plurality of non-conductive guide posts 20, 20, fixedly supported near the corners of the lower platen 18. Stops 21 secured to the upper ends of posts 20 limit the upward movement of the intermediate platen under the action of compression springs 23, the upper ends of which bear against non-conductive washers 24. The center platen is made in two halves 19a, 19b to simplify both initial manufacturing operations and servicing operations for self-apparent reasons.

Each of the two halves of the center platen 19a, 19b includes a combined heat seal and tear seal die 26 formed from good conductive material, such as copper or brass, and shaped lengthwise thereof in the configuration of the heat sealing operation to be performed. As herein shown by way of example, each of the dies 26 is generally rectangular in configuration and sized to form an envelope 30 open along one end edge 31 (FIG. 6). Die strips 26 are approximately one inch wide and their outer lateral edges are accurately shaped as is well known in this art with a heat sealing land 28 and a tear seal forming knife edge 29. The knife edge 29 lies in a plane spaced outwardly from the heat sealing land 28 and substantially cuts through the plastic stock when the die is closed against the stock. In accordance with conventional practice, the newly formed plastic items remain attached to the sheet stock as the sets of plastic sheets are indexed out of the sealing station but are readily separated from the stock in a hand separating operation.

As clearly appears from FIG. 2, the three platens are sized to accommodate at least a plurality of dies to make two or more items from each set of strips during each operating cycle of the sealing station. Thus as shown in that Figure there are two sets of die strips 26 on each face of the floating center platen and these are preferably arranged so that the adjacent parallel sides are either immediately adjacent one another or actually merged. For example, the thickness of the die strip is there shown as one and one half times the thickness of the remainder of these strips. The tear seal forming knife edge 29a is located intermediate the heat sealing lands 28a, 28a. Dies 26 are suitably fixed to their respective platens 19a, 19b as by mounting lugs 32. These lugs may be soldered or separably attached to die strips 26 and each includes a screw for detachably securing the lugs to one of the associated center platens.

A non-conductive ejector 35 is supported within each of die strips 26 on resilient rubber bosses 36 long enough to support the outer surface of the ejector in a plane outwardly of the plane of the heat sealing lands 28. The peripheries of the ejectors lie closely adjacent the sealing lands 28 and are effective as the die opens after a sealing operation to separate the plastic strips from the sealing lands.

Many items heat sealed by the die assembly 10 require one or more holes to receive loose leaf binder rings or the like. To meet this need each of the center platens is provided with blanking punches 38 having tubular outer ends sharpened with a cutting edge 39 to blank out discs of plastic. These discs pass inwardly along the tubular passages 40 which open through the sidewall of punches 38.

The adjacent surfaces of the upper and lower platens 17 and 18 are equipped with a layer of non-conductive material such as a sheet of Mylar or phenolic 42, 43 thereby electrically isolating all components of the floating center platen 19a, 19b from the upper and lower platens 17 and 18.

Referring now to FIGS. 1 and 2, the accessories employed in guiding a plurality of sets of continuous plastic strips 44, 45 past the opposite faces of the floating center platen will be described. The supply reels of the continuous plastic strips are not shown but will be understood as located to the left of FIG. 1. As best appears from FIG. 2, each of these sets of strips includes a narrow strip 44 and a slightly wider strip 45 and appropriate to make the transparent plastic envelope shown in FIG. 6. The strips of each set are channeled over suitably supported rollers 47, 48 into separate aligning channels of a suitable strip aligning device 50. Such aligners are well known and include separate passages for strips 44, 45. Each strip is accurately held in a particular position relative to the other by means of adjustable side guide plates 51, 52 lying in parallel vertical planes. The strips of each set then pass over rollers 53, 54 positioned to support the strips of each set in direct contact on a plane intermediate the sealing dies 26 and the adjacent surface of one of the upper and lower platens 17, 18. Guide rollers 53, 54 cooperate with and serve the same purpose as a companion set of rollers 55, 56 on the right hand side of the sealing station.

Thereafter the two sets of strips 44, 45 pass over other rollers 57, 58 and 59 which cooperate to bring both sets of strips into contact with one another at the entrance end of an automatic indexing mechanism 60. This indexing mechanism may be of any known construction and typically includes a power driven conveyor belt 61 mounted beneath a pair of cooperating clamps 62, 63 functioning alternately to press both sets of strips into contact with belt 61 to index the strips to the right. Thus clamp 62 moves downwardly to press both sets of strips against the conveyor belt and moves forwardly with belt 61 until the material has been indexed sufficiently to initiate the next heat sealing operation of die 10. Clamp 63 then clamps the material downwardly against the stopped conveyor belt as clamping mechanism 62 returns to its initial position shown in FIG. 1. The finished products issuing from the indexing device 60 are thereafter readily separated by hand from the stock material.

Another important accessory includes means for cooling die assembly 10 and particularly the floating center platen. This comprises a motor driven fan 70 having air distributing ducts 71 positioned to direct jets of cooling air over the die assembly from a position providing a minimum of interference with operation and servicing of the die assembly.

Die assembly 10 is energized from any suitable radio frequency generator 80 having one of its output leads 81 grounded and the other lead 82 connected to the upper platen 17, the lower platen 18 being grounded through the machine to complete the electrical circuit. An output of 750 to 1,000 kw suffices to form at least four 8×11 ring binder sized envelopes 30 during each heat sealing cycle. The die is closed in known manner by ram 13 operating at a pressure of about 80 psi. The press cycles about 15 to 20 strokes per minute to provide at least one finished envelope per second each having an open inlet 31 crosswise of its upper end. No heat sealing of this end occurs because the narrow strip 44 is fed through the heat sealing station with the edge forming inlet 31 spaced inwardly from the top edge of dies 26 as viewed in FIG. 2.

While the particular method and apparatus for heat sealing a plurality of sets of continuous plastic strips together by radio frequency energy herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. Radio frequency powered apparatus for heat sealing a plurality of sets of plastic sheets together to form simultaneously a plurality of separate items comprising:
   at least three superimposed platens including an upper platen, a lower platen and an intermediate platen normally resiliently supported between and spaced from said upper and lower platens and including means electrically isolating said platens from one another;
   heat sealing die means on the opposed faces of said intermediate platen shaped to cooperate with the juxtaposed face of the adjacent one of said upper and lower platens to heat seal the sheets of each set of plastic sheets together in areas thereof held in pressurized contact with one another;
   a source of radio frequency energy having the output thereof connected to energize said platens when the same are held pressed against respective sets of plastic sheets on the remote sides of said sealing die means; and
   means supporting said platens for reciprocation toward one another to compress the sheets of said sets of sheets together in areas in contact with said die means while said platens are energized with radio frequency energy to heat seal the sheets of each of said sets of sheets together.

2. Heat sealing apparatus as defined in claim 1 characterized in the provision of means for cooling said intermediate platen.

3. Heat sealing apparatus as defined in claim 2 characterized in that said cooling means includes means for circulating air over at least said intermediate platen.

4. Heat sealing apparatus as defined in claim 1 characterized in that said die means comprises elongated strip means lying normal to and secured to each of the opposed faces of said intermediate platen, and the remote edges of said strip means being formed longitudinally thereof with a heat sealing land and a cutting edge protruding slightly beyond the surface of said sealing land.

5. Heat sealing apparatus as defined in claim 4 characterized in that said intermediate platen is formed in two halves separably secured together on a plane lying between and parallel to the opposed faces of said intermediate platen.

6. Heat sealing apparatus as defined in claim 4 characterized in that said strip means on each face of said intermediate platen is arranged to form a plurality of separate plastic items of manufacture.

7. Heat sealing apparatus as defined in claim 6 characterized in that said strip means on each face of said intermediate platen has a portion thereof arranged to heat seal the contiguous edges of adjacent items of manufacture together and including means for forming a common tear joint readily separable upon discharge of said items from said apparatus.

8. Heat sealing apparatus as defined in claim 4 characterized in the provision of resiliently supported ejector means extending along said cutting edge of said strip means and normally lying in a plane spaced closely outwardly of the plane of the cutting edge of said strip means, said ejector means being operable upon the withdrawal of said platens away from one another at the end portion of a heat sealing cycle of said apparatus to eject said freshly sealed sets of sheets away from said strip means.

9. Heat sealing apparatus as defined in claim 1 characterized in the provision of a plurality of said die means on the opposed faces of said intermediate die means cooperable with one another to form a plurality of separate heat sealed items simultaneously between said intermediate platen and each of said upper and lower platens.

10. Heat sealing apparatus as defined in claim 1 characterized in that said means for pressing said platens toward one another comprises powered press means having a bed supporting said lower platen, vertically reciprocable ram means overlying said lower and intermediate platens and having said upper platen fixed thereto parallel to said lower and intermediate platens.

11. Heat sealing apparatus as defined in claim 10 characterized in that said means resiliently supporting said intermediate platen between said upper and lower platens comprises a plurality of non-conductive guide pins having a close sliding fit through parallel openings in said intermediate platen and lying normal to and fixed to one of said upper and lower platens, and including coil spring means embracing said dowel pins between said intermediate platen and at least one of said upper and lower platens and electrically isolated from one of said platens.

12. Heat sealing apparatus as defined in claim 1 characterized in that said intermediate platen includes means normally retaining the same movably and captively assembled to at least one of said upper and lower platens.

13. Heat sealing apparatus as defined in claim 12 characterized in that said intermediate platen and that one of said upper and lower platens captively assembled thereto are structurally independent of the other one of said platens.

14. Heat sealing apparatus as defined in claim 1 characterized in that said intermediate platen includes means holding the same captively assembled to one of said upper and lower platens and movable toward and away therefrom along an axis normal to each of said platens.

15. Heat sealing apparatus for indexing two sets of plastic strips through a sealing station powered by radio frequency energy and sequentially heat sealing the sheets of each of said sets together in selected areas thereof as said sets of strips are indexed through said sealing station comprising:

fluid-operated reciprocable press means having a lower platen aligned with reciprocable ram means having its axis normal to said lower platen;

heat sealing die means adapted to be positioned between said lower platen and said ram means, an upper platen securable to said ram means in a plane parallel to said lower platen, and an intermediate platen electrically isolated from said upper and lower platens and equipped on its opposed surfaces with die means cooperable with a respective one of said upper and lower platens to heat seal the sheets of said sets of plastic sheets together in preselected areas thereof;

guide means supporting said intermediate platen out of contact with each of said upper and lower platens when said ram means is retracted;

means for indexing a set of plastic sheets past each of the opposite faces of said intermediate platen; and means to energize said platens with radio frequency energy while said ram means is extended thereby simultaneously heat sealing the sheets of each pair together.

16. Heat sealing apparatus as defined in claim 15 characterized in the provision of feeding guide means for said sets of plastic sheets including means for separately aligning the sheets of each set thereof with their lateral edges in predetermined parallel positions relative to one another before entering said sealing station.

17. Heat sealing apparatus as defined in claim 16 characterized in that said sheet aligning means is operable to align one adjacent pair of lateral edges with one another and to maintain the lateral edges along the other lateral edges of the same set of sheets in predetermined spaced apart relation.

18. Heat sealing apparatus as defined in claim 17 characterized in that said die means is constructed and arranged to heat seal said sets of sheets together in preselected areas excluding pre-selected lateral edges of said sheets maintained in predetermined spaced apart relation by said sheet aligning means.

19. Heat sealing apparatus as defined in claim 15 characterized in that said intermediate platen includes tubular blanking die means mounted normal to the opposite faces thereof having a sharp edge at the outer end thereof and cooperable with a respective one of said upper and lower platens during a heat sealing cycle of said apparatus to blank out openings in each of said sets of sheets.

20. Heat sealing apparatus as defined in claim 19 characterized in the provision of a plurality of said tubular blanking die means mounted on and projecting from the opposite faces of said intermediate platen, said tubular die means being arranged in a row inwardly of one side of said die means and sized to blank out holes to accommodate ring binder means.

21. Heat sealing apparatus as defined in claim 15 characterized in the provision of blower means for circulating a cooling gas over at least said intermediate platen exteriorly of the edges thereof.

22. That method of simultaneously heat sealing two sets of a plurality of superimposed plastic strips together in predetermined selected areas thereof in successive heat sealing cycles which comprises:

advancing separate sets of superimposed plastic strips past the opposite faces of a platen having heat sealing and tear forming dies fixed to and protruding from a respective face thereof and which platen is floatingly positioned directly between and electrically isolated from the upper and lower platens of a radio frequency powered heat sealing press; and closing said upper and lower platens toward one another while energizing the same with radio frequency power thereby to heat seal said sets of strips together in predetermined selected areas before indexing said sets of strips forwardly for the next heat sealing cycle.

23. That method of heat sealing sets of plastic strips together defined in claim 22 characterized in the step of circulating a cooling gas over at least the center one of said platens.

24. That method of heat sealing sets of plastic strips together as defined in claim 23 characterized in providing said center platen with die means on each face thereof for forming a plurality of separate items of manufacture each separable from the associated one of said sets of plastic strips along tear seals.

25. That method of heat sealing sets of plastic strips together as defined in claim 22 characterized in the step of heat sealing together the strips of each of said sets thereof along three sides lying at right angles to one another to form a pocket having an unsealed inlet opening along said fourth side.

26. That method defined in claim 25 characterized in the step of forming a plurality of open sided pockets opposite the opposed faces of said center platen during each heat sealing cycle.

27. That method defined in claim 22 characterized in the step of blanking out openings through each of said sets of strips during each heat sealing cycle.

* * * * *